United States Patent [19]

Deal

[11] 4,037,347
[45] July 26, 1977

[54] FISHING BAIT HOLDER

[76] Inventor: Kenneth L. Deal, R.R. No. 1, Palo, Iowa 52324

[21] Appl. No.: 666,435

[22] Filed: Mar. 12, 1976

[51] Int. Cl.² .............................................. A01K 97/00
[52] U.S. Cl. ................................................ 43/4; 43/55
[58] Field of Search ............... 43/4, 55, 44.4, 44.6, 43/54.5 R; 17/68, 66, 70; 294/106

[56] References Cited
U.S. PATENT DOCUMENTS 2,634,159  4/1953  Agneberg .............................. 43/4
2,881,022  4/1959  Brust ................................... 294/106
3,181,198  5/1965  Stelzen ................................ 17/70

Primary Examiner—Warner H. Camp
Attorney, Agent, or Firm—James C. Nemmers; Haven E. Simmons

[57] ABSTRACT

A pair of elongated outwardly curved grippers are pivotally connected along one edge and have cooperating lip portions along their opposite edges. An elongated handle formed from spring material has free ends connected to the grippers adjacent the lip portions and normally bias the grippers to an open position.

2 Claims, 4 Drawing Figures

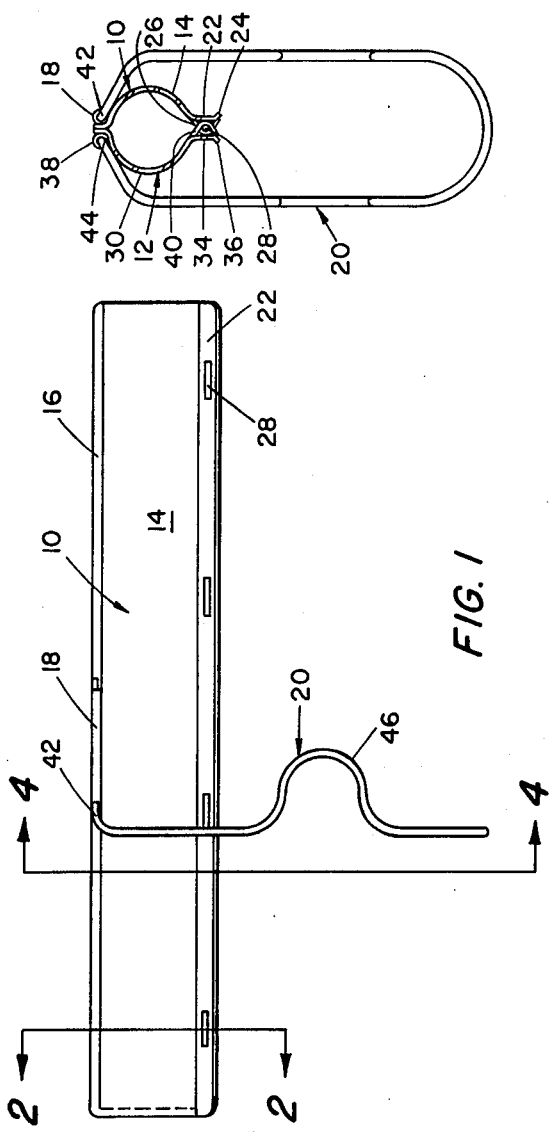
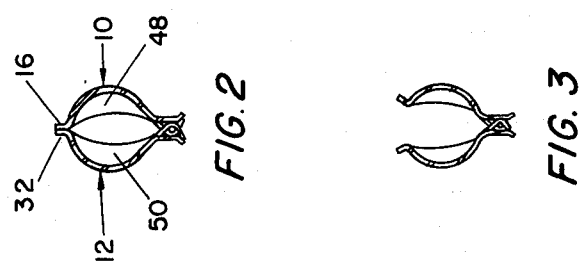

FISHING BAIT HOLDER

BACKGROUND OF THE INVENTION

There are a number of fishermen who still find the handling of fish bait, especially live bait, with the bare fingers unpleasant. Particularly, with some types of bait such as leeches, handling of the bait can result in minor injury and discomfort to the fingers. Women and some small children especially find the handling of bait sufficiently undesirable to discourage them from enjoying the sport of fishing. Because most bait is usually difficult to handle and is slippery, there is always the danger of running a fishhook through a finger when attempting to thread the bait on the fishhook.

There are also some fishermen who believe that when bait is handled with the bare hands that the bait will pick up a scent from the fingers which fish can detect. This is especially true if the fingers are contaminated with gasoline, oil, insect repellants, etc. Therefore, handling of bait with the bare fingers is undesirable since it may deter fish from taking the bait.

There have been a number of bait holders designed in an attempt to minimize manual handling of the bait. However, some of these do not allow the bait to be picked up and adequately held without damage to the bait. Other such holders are such that they almost completely enclose the bait, thereby preventing the bait from being threaded onto the fishhook. It is, therefore, the object of the invention to provide a simple, inexpensive fish bait holder which will allow fish bait to be picked up, gently but firmly held, and to be held properly for threading on a fishhook.

SUMMARY OF THE INVENTION

The invention provides a very simple four-piece bait holder which when assembled is extremely natural and easy to hold and thread the bait on the fishhook. The holder of the invention consists of two corresponding grippers pivoted along their lower edge so as to be capable of being opened and closed at the top. The top edge of each gripper is provided with a lip to permit proper holding of the bait. The grippers are held by a one-piece combination handle and spring which normally biases the grippers to an open position. By squeezing the handle, the lips are brought together with the desired pressure to hold the bait between the lips and in the trough formed by the grippers until the bait can be threaded onto the fishhook.

BRIEF DESCRIPTION OF THE DRAWINGS

FIG. 1 is a side elevational view of the bait holder of the invention;

FIG. 2 is a sectional view taken on the line 2—2 of FIG. 1;

FIG. 3 is a sectional view similar to FIG. 2 but showing the bait holder in an open position; and FIG. 4 is a sectional view taken on the line 4—4 of FIG. 1.

DESCRIPTION OF THE PREFERRED EMBODIMENT OF THE INVENTION

The bait holder of the invention consists of two corresponding grippers indicated generally by the reference numerals 10 and 12. The grippers 10 and 12 are similarly constructed, and gripper 10 will be first described in detail.

Gripper 10 consists of a main body 14 which is curved outwardly along its entire length and which has an upwardly extending lip 16 along its top edge. Approximately midway along lip 16, a portion of the lip 16 is bent or formed outwardly to provide a longitudinally extending passageway 18 which receives one end of the handle 20. The lower end of gripper 10 has a generally downwardly extending portion 22, terminating in a lower edge 24. At spaced intervals along the portion 22 of gripper 10, the material forming gripper 10 is cut and formed inwardly to form links 26 which provide passageways for the insertion of a link pin 28 as more fully described hereinafter.

Similar to gripper 10, gripper 12 has a main body 30 that curves outwardly and the upper edge of which extends upwardly to form a lip 32. The lower portion of gripper 12 has a downwardly extending portion 34 which terminates in an outer edge 36. The lip 32 also has a formed passageway 38 to receive the other free end of handle 20, and similar to gripper 10, the portion 34 of gripper 12 has at spaced intervals portions formed inwardly to provide links for receiving hinge pin 28. Note that the links 26 of gripper 10 are offset axially from the links 40 of gripper 12 so that links 26 and 40 do not interfere with one another but rather provide alternatively spaced passageways to receive hinge pin 28.

Handle 20 is of a simple one-piece construction and is preferably formed from a spring-like material into a generally U-shaped configuration with laterally extending legs 42 and 44 which fit into passageways 18 and 38, respectively, of grippers 10 and 12. Each of the depending portions of handle 20 preferably has a laterally extending curved portion 46 which provides a finger support to facilitate operation and use of the bait holder.

With the foregoing described construction of the four basic components, it will be obvious that grippers 10 and 12 can be easily formed as metal stampings or easily formed plastic components which when properly positioned relative to one another allow the insertion of a simple hinge pin 28 through the links 26 and 40. Handle 20 is easily attached by inserting the legs 42 and 44 through their respective passageways 18 and 38 and the device is ready for use.

When assembled and ready for use, the bait holder of the invention completely eliminates handling of live bait with the bare fingers. When the fisherman wishes to pick up bait, such as a night crawler, tongs, tweezers, or some other suitable means may be used. With bait such as leeches, the handle 20 is grasped and the holder is inverted (with the handle 20 extending upwardly) and placed over the live bait. The handle 20 is squeezed by the user until the lips 16 and 32 grasp the bait with the necessary pressure. With the bait held between the lips 16 and 32, the device is inserted to allow the bait to fall down into the trough formed between the main body 14 and main body 30. If the bait is a night crawler, a part of the worm should be left exposed and held between the lips 16 and 32. This then makes it easier to thread the night crawler on the fishhook.

I also prefer to provide at one end of each of the grippers 10 and 12 end members 48 and 50, respectively, which serve to partially close off that end. Note from FIG. 2 that a gap remains in the end. The end members 48 and 50 prevent the bait from lengthening out and escaping from the trough formed between the main bodies 14 and 30. The end members 48 and 50 also serve as gripping means to hold live bait with a portion of the live bait extending outside of the device. This is especially useful with leeches but can also be used with night crawlers.

As previously indicated, the device of the invention also works very well when used with a pair of tongs to pick up the bait. When tongs or other pick up devices are used, the bait, such as a worm, is easily placed inside of the open grippers 10 and 12 and pulled through the partially closed end to straighten out the worm. A portion of the worm should be held outside of the grippers so that it will extend beyond the lips 16 and 32 when the handle 20 is squeezed to close the device and thereby hold the bait for placement on the fishhook.

There are obviously a number of variations and modifications that can be made to the preferred embodiment disclosed herein without departing from the spirit and scope of the invention. Such things as a different hinge construction, a different handle construction, changes in dimension, etc. are certainly variations obvious to those skilled in the art. It is my intention that all such revisions and variations which are obvious to those skilled in the art will be included within the scope of the following claims.

I claim:

1. A fishing bait holder comprising a pair of confronting generally parallel grippers each having a longitudinally extending top edge and a longitudinally extending lower edge generally parallel to said top edge, the top edge and lower edge of each of said grippers being joined by an outwardly curved central portion, a plurality of links formed at spaced intervals along the lower edge portions of said grippers and a single hinge pin extending through said links along substantially the entire length of the holder to pivotally join said grippers, a generally upwardly extending lip along the top edge of each of said grippers which lips engage one another when said holder is closed, said central portions of said grippers forming a narrow longitudinally extending trough for the reception of bait, an end member at one end of each of said grippers which end members partially enclose said trough when said holder is closed with said lips engaged, and a downwardly extending handle connected at its upper end to said grippers near the top edges thereof, said handle being formed of resilient material so as to normally bias the holder to an open position with said lips separated.

2. The fishing bait holder of claim 1 in which said handle is of a one-piece construction and has provided thereon finger supports to facilitate opening and closing the holder.

* * * * *